United States Patent [19]

Herbrechtsmeier et al.

[11] Patent Number: 4,863,236
[45] Date of Patent: Sep. 5, 1989

[54] OPTICAL WAVEGUIDE WITH AN ESSENTIALLY FLUORINE-FREE POLYMER CORE AND A FLUORINE-CONTAINING POLYMER JACKET

[75] Inventors: Peter Herbrechtsmeier, Königstein; Manfred Fleissner, Eschborn; Werner Groh, Frankfurt am Main; Rudolf Heumüller, Bad Soden am Taunus; Gerhard Wieners, Frankfurt am Main, all of Fed. Rep. of Germany

[73] Assignee: Hoechst Aktiengesellschaft, Frankfurt am Main, Fed. Rep. of Germany

[21] Appl. No.: 21,469

[22] Filed: Mar. 4, 1987

[30] Foreign Application Priority Data

Mar. 6, 1986 [DE] Fed. Rep. of Germany ....... 3607301

[51] Int. Cl.$^4$ .............................................. G02B 6/02
[52] U.S. Cl. .................................. 350/96.34; 526/204; 526/245
[58] Field of Search ............... 350/96.34, 96.29, 96.30; 526/245, 204

[56] References Cited

U.S. PATENT DOCUMENTS

| | | | |
|---|---|---|---|
| 4,613,657 | 9/1986 | Narita et al. | 526/204 |
| 4,615,584 | 10/1986 | Ohmori et al. | 350/96.34 |
| 4,693,553 | 9/1987 | Sasaki et al. | 350/96.34 |
| 4,720,166 | 1/1988 | Ohmori et al. | 350/96.34 |
| 4,720,428 | 1/1988 | Ohmori et al. | 350/96.34 X |
| 4,786,658 | 11/1988 | Hashimoto et al. | 350/96.29 X |

FOREIGN PATENT DOCUMENTS

0155567 9/1985 European Pat. Off. .

OTHER PUBLICATIONS

Isikawa, N. et al, *J. Fluorine Chem.* 25, 203–212 (1984).

*Primary Examiner*—John D. Lee

[57] ABSTRACT

Optical waveguides of plastic usually consist of a core and a jacket, the core material having a higher refractive index than the jacket material. A suitable core material is a fluorine-free polymer and a suitable jacket material is a fluorine-containing polymer, which can also contain deuterium. The optical waveguides can be produced by passing a polymer rod through a solution of the jacket polymer and then removing the solvent. The optical waveguides are particularly suitable for the transmission of data with the aid of light waves with a wavelength of 500 to 750 nm.

10 Claims, No Drawings

OPTICAL WAVEGUIDE WITH AN ESSENTIALLY FLUORINE-FREE POLYMER CORE AND A FLUORINE-CONTAINING POLYMER JACKET

The invention relates to an optical waveguide with a core-jacket structure, the core of which consists of a transparent fluorine-free polymer and the jacket of which consists of a transparent fluorine-containing polymer, the relative refractive index difference $$\frac{n_{core} - n_{jacket}}{n_{core}}$$

being at least 0.2 percent, and to a process for the production of this guide and its use.

It is known that an optical fiber consisting of plastic has a core consisting of a fluorine-free polymer based on poly(methyl methacrylate) and a jacket which surrounds the core and consists of a fluorine-containing polymer, for example polymers of esters of fluorinated alcohols with methacrylic acid (European Application Publication No. 0,155,567). The refractive index of the jacket polymer here should be at least 1% lower than the refractive index of the core polymer, and the core polymer and jacket polymer should have a glass transition temperature of more than 80° C. The optical fibers are produced either by a spinning process, in which the core polymer and jacket polymer are extruded from a special die, or by a coating process, in which a fiber of the core polymer is coated with a solution of the jacket polymer and the solvent is then removed.

The object of the invention is to provide an optical waveguide with a core-jacket structure, the core and jacket consisting of different polymers and the adhesion between the core and jacket not being impaired.

The invention relates to an optical waveguide with a core-jacket structure, the core of which consists of a transparent fluorine-free polymer and the jacket of which consists of a transparent fluorine-containing polymer, the relative refractive index difference $$\frac{n_{core} - n_{jacket}}{n_{core}}$$

being at least 0.2 percent, in which the core polymer is essentially a methyl methacrylate polymer or a polycarbonate and the jacket polymer is essentially a polymer containing monomer units derived from a compound of the formula (1)

$$H_2C=CF-CO-O-C(CF_3)_2-X \qquad (1)$$

in which X denotes a hydrogen atom or a deuterium atom.

The invention furthermore relates to a process for the production of an optical waveguide with a core-jacket structure, the core of which consists of a transparent fluorine-free polymer and the jacket of which consists of a transparent fluorine-containing polymer, the relative refractive index difference $$\frac{n_{core} - n_{jacket}}{n_{core}}$$

being at least 0.2 percent, by enclosing the fibrous core polymer with a layer of the jacket polymer, which comprises drawing a rod essentially consisting of a methyl methacrylate polymer or a polycarbonate through a solution of a polymer containing monomer units derived from a compound of the formula (1)

$$H_2C=CF-CO-O-C(CF_3)_2-X \qquad (1)$$

in which X denotes a hydrogen atom or a deuterium atom, in an anhydrous organic solvent which essentially does not dissolve the core polymer, and then removing the solvent.

The core polymer is essentially a methyl methacrylate polymer, that is to say a methyl methacrylate homopolymer or a copolymer of methyl methacrylate and another vinyl monomer, for example vinylidene fluoride, or a polycarbonate, preferably a polyester of carbonic acid with dihydroxy-diphenyl-2,2-propane. The core polymer has an average molar mass (measured by the light scattering method) of $8 \times 10^4$ to $25 \times 10^4$, preferably $1 \times 10^5$ to $2 \times 10^5$, a glass transition temperature of 100° to 170° C., preferably 110° to 150° C., and a refractive index ($n_D^{23}$) of 1.4 to 1.6, preferably 1.44 to 1.59. The core polymer can also be a mixture of a methyl methacrylate polymer and a polycarbonate.

The jacket polymer is essentially a polymer containing monomer units derived from a compound of the formula (1)

$$H_2C=CF-CO-O-C(CF_3)_2-X \qquad (1)$$

in which X denotes a hydrogen atom or a deuterium atom. Possible monomers are hexafluoroisopropyl α-fluoroacrylate and deuterohexafluoroisopropyl α-fluoroacrylate. The jacket polymer has an average molar mass (measured by the light scattering method) of 8,000 to 5,000,000, preferably 10,000 to 200,000, a glass transition temperature of 95° to 150° C., preferably 100° to 145° C., and a refractive index ($n_D^{23}$) of 1.34 to 1.46, preferably 1.348 to 1.400. The jacket polymer can also be a polymer mixture.

The jacket polymer is obtainable in the customary manner by polymerization, preferably in bulk, of the monomer hexafluoroisopropyl α-fluoroacrylate or deuterohexafluoroisopropyl α-fluoroacrylate with the aid of a free radical initiator, at a temperature of 60° to 150° C. The monomers can be prepared as follows:

(a) 150 g (1 mol) of dimethyl α-fluoromalonate (see Journal of Fluorine Chemistry 25 (1984), 203–212) are added dropwise to a mixture of 96 g of a 35 percent strength by weight aqueous solution of formaldehyde (1.1 mol) and 10 g (0.1 mol) of potassium bicarbonate at a temperature of 25° C. in the course of one hour. The reaction solution is then mixed with four times the volume of a saturated aqueous ammonium chloride solution and the mixture is extracted three times with 150 ml of methylene chloride each time. The combined extraction solutions are dried over sodium sulfate. After evaporation of the methylene chloride, dimethyl α-hydroxymethyl-α-fluoromalonate is obtained as a colorless solid.

180 · g (1 mol) of dimethyl α-hydroxymethyl-α-fluoromalonate are heated at the boiling point in 1.5 liters of 6N hydrochloric acid for 2.5 hours and are thereby dehydrated and decarboxylated. When the evolution of gas has ended, the reaction mixture is distilled under a pressure of 700 mbar and the distillate is extracted three times with in each case 150 ml of diethyl ether. The combined extraction solutions are dried over sodium sulfate. After 19 g (1.1 mol) of gaseous ammonia has been passed into the ether solution, the ammonium salt of α-fluoroacrylic acid is obtained as a colorless solid.

107 g (1 mol) of the ammonium salt of α-fluoroacrylic acid are mixed with 14.5 g (0.2 mol) of dimethylformamide and 0.6 liter of xylene, and 131 g (1.1 mol) of thionyl chloride are added dropwise to the mixture in the course of one hour; the mixture is then warmed at a temperature of 80° C. for two hours. After cooling to a temperature of 0° C., a mixture of 204 g (1.1 mol) of tributylamine and 185 g (1.1 mol) of hexafluoroisopropanol is added to the reaction mixture in the course of 30 minutes. The mixture is then stirred at a temperature of 30° C. for a further hour and is finally filtered. The filtrate is distilled under a pressure of 270 mbar and hexafluoroisopropyl α-fluoroacrylate is obtained as a colorless liquid.

(b) Deuterohexafluoroisopropyl α-fluoroacrylate is obtained analogously to procedure (a) if dideuterohexafluoroisopropanol is used instead of hexafluoroisopropanol in the third stage.

The optical waveguide according to the invention is produced by enclosing a rod of the core polymer in a layer of the jacket polymer. For this, the rod-shaped core polymer is drawn through a solution of the jacket polymer in an anhydrous organic solvent which essentially does not dissolve the core polymer, and the solvent is then removed.

The solvent which is used, which essentially does not dissolve the core polymer, that is to say does not dissolve it at all or dissolves it to only a poor degree, is, in particular, a lower alkanol, preferably methanol, a lower ketone, preferably acetone, or an acetic acid ester of a lower alkanol, preferably ethyl acetate. If appropriate, the solvent is used in the form of a mixture of several of the abovementioned individual solvents. The concentration of the jacket polymer in the solution is 2 to 15, preferably 6 to 10, percent by weight.

The core polymer rod has a diameter of 0.1 to 2 mm, preferably 0.5 to 1 mm. For coating with the jacket polymer, it is passed through the solution of the jacket polymer in a vessel which has, in the bottom, a capillary opening with a circular cross-section; the diameter thereof is 10 to 40 percent more than that of the particular rod diameter. Immediately after exit from the capillary opening, the coated rod is freed from adhering solvent. This is effected, for example, by evaporation at a temperature of 30° to 120° C., preferably 50° to 100° C., under a pressure of 200 to 1,000 mbar, preferably 800 to 1,000 mbar. The thickness of the jacket thus obtained is 0.003 to 0.05 mm, preferably 0.005 to 0.02 mm.

The optical waveguide according to the invention is suitable for the transmission of data with the aid of light waves with a wavelength of 500 to 750 nm, preferably 600 to 670 nm. It exhibits a damping of not more than 1,500 and preferably not more than 1,000 dB(A)/km.

The following examples serves for further illustration of the invention. Percentage data in each case relate to the weight.

EXAMPLE

A 10 percent strength solution of poly(hexafluoroisopropyl α-fluoroacrylate) which had an average molar mass of 150,000 (measured by the light scattering method), a glass transition temperature of 109° C. and a refractive index of $n_D^{23} = 1.355$ in anhydrous methanol was introduced into a vessel which had, in the bottom, a capillary opening of circular cross-section with a diameter of 1 mm. A rod of poly(methyl methacrylate) which had an average molar mass of 180,000 (measured by the light scattering method), a glass transition temperature of 107° C. and a refractive index of $n_D^{23} = 1.49$ was drawn through the solution and through the capillary opening; the diameter of the rod was 0.8 mm. Immediately after exit from the capillary opening, the coated rod was passed through an air bath which was kept at a temperature of 70° C. with the aid of two radiant heaters. The methanol thereby evaporated and a layer of poly(hexafluoroisopropyl α-fluoroacrylate) firmly adhering to the core and with a thickness of 0.02 mm resulted. The resulting optical waveguide with a core-jacket structure showed a damping of 800 dB(A)/km when used as a data transmitter with the aid of light waves of wavelength 670 nm.

We claim:

1. An optical waveguide with a core-jacket structure, the core of which consists essentially of a transparent fluorine-free polymer and the jacket of which consists essentially of a transparent fluorine-containing polymer, the relative refractive index difference $$\frac{n_{core} - n_{jacket}}{n_{core}}$$

being at least 0.2 percent, in which the core polymer is essentially a methyl methacrylate polymer or a polycarbonate and the jacket polymer is essentially a polymer containing monomer units derived from a compound of the formula (1)

$$H_2C=CF-CO-O-C(CF_3)_2-X \qquad (1)$$

in which X denotes a hydrogen atom or a deuterium atom.

2. An optical waveguide as claimed in claim 1, wherein the core polymer consists essentially of a methyl methacrylate polymer, a polycarbonate or a mixture of a methyl methacrylate polymer and a polycarbonate.

3. An optical waveguide as claimed in claim 1, wherein the core consists essentially of a homopolymer or copolymer having a refractive index, $n_D^{23}$, of 1.4 to 1.6, and the jacket consists essentially of a polymer or polymer mixture having a refractive index, $n_D^{23}$, which is greater than about 1.34 but less than 1.400.

4. An optical waveguide as claimed in claim 3, wherein the jacket consists essentially of a polymer having a refractive index of about 1.355.

5. A method for transmitting data with the aid of light waves which comprises irradiating a waveguide comprising the core-jacket structure of claim 1 with a light wave having a wavelength of 500 to 750 nm.

6. An optical waveguide with a core-jacket structure, the core of which consists essentially of homopolymeric poly(methyl methacrylate) having a refractive index, $n_D^{23}$, of 1.44 to 1.59, and the jacket of which consists essentially of poly(hexafluoroisopropyl-α-fluoroacrylate)homopolymer having a refractive index, $n_D^{23}$, of 1.348 to 1.400.

7. An optical waveguide as claimed in claim 6, wherein the jacket consists essentially of said homopolymer having (a) an average molar mass of 150,000, measured by the light scattering method, and (b) a refractive index of 1.355.

8. A method for the preparation of an optical waveguide with a core-jacket structure in which the relative refractive index difference, defined by the expression $$\frac{n_{core} - n_{jacket}}{n_{core}}$$

in which $n_{core}$ is the refractive index of the core and $n_{jacket}$ is the refractive index of the jacket, is at least 0.2%, comprising the steps of:
  drawing a rod-shaped core polymer which is essentially fluorine-free and consists essentially of a methyl methacrylate polymer or a polycarbonate or a mixture thereof through a solution consisting essentially of: (a) a polymer which contains monomer units derived from the formula (1)

$$H_2C=CF-CO-O-C(CF_3)_2-X \qquad (1)$$

in which X denotes a hydrogen atom or a deuterium atom and (b) an anhydrous organic solvent which essentially does not dissolve the core polymer, and then removing the solvent.

9. The process as claimed in claim 8, wherein a lower alkanol, a lower ketone or an acetic acid ester of a lower alkanol is used as the solvent.

10. The process as claimed in claim 8, wherein the removal of the solvent is carried out by evaporation at a temperature of 30° to 120° C.

* * * * *